United States Patent
Sugahara et al.

(10) Patent No.: US 6,745,166 B1
(45) Date of Patent: Jun. 1, 2004

(54) CONTENTS INFORMATION RECORDING METHOD, CONTENTS INFORMATION PROCESSING UNIT, CONTENTS INFORMATION DECIPHERING METHOD, CONTENTS INFORMATION DECIPHERING UNIT AND MEDIA THEREOF

(75) Inventors: Takayuki Sugahara, Kanagawa-ken (JP); Atsumi Hirata, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 09/537,266

(22) Filed: Mar. 29, 2000

(30) Foreign Application Priority Data

Apr. 22, 1999 (JP) .......................................... 11-114661

(51) Int. Cl.$^7$ ......................... G06F 17/60; H04K 11/00; H04L 9/00

(52) U.S. Cl. ............................. 705/57; 705/58; 705/59; 380/285; 380/4

(58) Field of Search .............................. 705/57, 58, 59, 705/1; 380/285, 4

(56) References Cited

U.S. PATENT DOCUMENTS

| | | | | |
|---|---|---|---|---|
| 5,883,958 A | * | 3/1999 | Ishiguro et al. | 705/57 |
| 5,886,979 A | * | 3/1999 | Moribe et al. | 369/47.12 |
| 6,081,785 A | * | 6/2000 | Oshima et al. | 369/272 |
| 6,141,483 A | * | 10/2000 | Yamada et al. | 386/46 |
| 6,301,569 B1 | * | 10/2001 | Oshima et al. | 369/272 |
| 6,343,282 B1 | * | 1/2002 | Oshima et al. | 705/57 |
| 6,381,588 B2 | * | 4/2002 | Oshima et al. | 705/59 |
| 6,438,235 B2 | * | 8/2002 | Sims, III | 380/285 |
| 6,445,795 B1 | * | 9/2002 | Sako et al. | 380/201 |
| 6,463,155 B1 | * | 10/2002 | Akiyama et al. | 380/278 |
| 2001/0013023 A1 | * | 8/2001 | Oshima et al. | 705/57 |
| 2001/0055132 A1 | * | 12/2001 | Oshima et al. | 359/109 |

FOREIGN PATENT DOCUMENTS

| | | | | |
|---|---|---|---|---|
| EP | 644474 A1 | * | 3/1995 | G06F/1/00 |
| EP | 773490 A1 | * | 5/1997 | G06F/1/00 |
| EP | 1018733 A1 | * | 7/2000 | G11B/20/10 |
| EP | 1047062 A2 | * | 10/2000 | G06F/1/00 |
| JP | 10269289 | | 10/1998 | |
| JP | 10283268 | | 10/1998 | |

OTHER PUBLICATIONS

Consumer Electronic, Development see imminent or rewritable DVD truce (Industry Trend or Event), Jan. 8, 2001, Warren Communication News, v41, n2.*
Automatic ID, News, Two–Dimensional bar codes make environmental sampling a breeze, Mar., 1995.*
Takahashi, Richard, Data Security chips ward off intrusions (Embeded Systems: part 3: 32 designs, Apr. 28, 1997, electronics Engineering Times, n951, p. 98.*

* cited by examiner

Primary Examiner—James P. Trammell
Assistant Examiner—Firmin Backer
(74) Attorney, Agent, or Firm—Nath & Associates PLLC; Marvin C. Berkowitz

(57) ABSTRACT

When enciphered contents information is transferred from media A to media B, enciphered key information and ID(A) of the media A are recorded as a control number of data link ID in a memory of a media control unit. The control number is attached to the enciphered contents information and duplicated to the media B with the enciphered key information. The enciphered key information read from the media B and the enciphered key information read from the media B are compared with each other. When they coincide, a differential ID (A–B) value which is a differential value between media A ID and media B ID is outputted to the media B. After the output, the enciphered key information and ID(A) recorded in the memory are deleted.

21 Claims, 4 Drawing Sheets

FIG.6

CONTENTS INFORMATION RECORDING METHOD, CONTENTS INFORMATION PROCESSING UNIT, CONTENTS INFORMATION DECIPHERING METHOD, CONTENTS INFORMATION DECIPHERING UNIT AND MEDIA THEREOF

BACKGROUND OF THE INVENTION

1. Field of the Invention

The present invention relates to a contents information encryption system for recording and reproducing enciphered contents information enciphered with a predetermined contents key and enciphered key information obtained by enciphering the contents key for use in the enciphered contents information by using media ID as ID key.

An object of the present invention is to provide a contents information recording method for contents information enciphering system which distributes contents information (particularly audio and video data) and enables users to transfer the distributed data between media while preventing illegal transfer (move) and duplication thereof, and contents information processing unit, contents information deciphering method, contents information deciphering unit and media thereof.

2. Description of the Background Art

With a progress of enciphering technology, digital contents distribution management method, digital contents reproduction method and apparatus therefor have been proposed in Japanese Patent Application Laid-Open No. 10-269289 as an effective method for distributing audio or video digital data through network. According to the present invention, a distribution side of digital contents processes and compresses digital contents and sends the processed digital contents, enciphered contents key and enciphered accounting information to communication receivers. Money collected based on contents use information sent from the communication receivers is distributed to privilege persons. On the other hand, a digital contents reproducing side deciphers that processed digital contents with the contents key and simultaneously expands it to reproduce the original data. Then, data on charge money depending on use of the contents and contents use information are sent to the contents information distribution side. The recorded contents can be carried away to other places.

Further, Japanese Patent Application Laid-Open No. 9-25303 has disclosed an information recording media, recording unit, information transmission system and deciphering unit. The information recording media of the present invention contains enciphered information and enciphered key information obtained by enciphering key information for deciphering this enciphered information to its original information. Further, it contains condition information for deciphering the aforementioned enciphered information in a non-enciphered state. That is, because device information and region information are included in control information of the enciphered key information, duplication of the enciphered information into HDD or optical disk on user side for illegal use is prevented.

However, according to the above conventional described system, because media in which the contents data is recorded cannot be transferred between users (although the media itself can be transferred, the contents data recorded in that media cannot be reproduced properly), user needs to connect account control center, data management center or the like at least once in order to receive the contents data.

Further, when a person has plural kinds of media, he cannot move data between the media or return the data to any medium after backup of the data while preventing illegal transfer and duplication.

SUMMARY OF THE INVENTION

Accordingly, an object of the present invention is to provide a contents information recording method, contents information processing unit, contents information deciphering method, contents information deciphering unit and media in contents information encryption system which distributes contents information and enables user to transfer (move) data between media while preventing illegal transfer and duplication of the distributed data.

To achieve the above object, there is provided a contents information recording method for recording enciphered contents information and enciphered key information from a first medium which records the enciphered contents information enciphered with a predetermined contents key and enciphered key information obtained by enciphering the contents key with information about media ID of the first medium as an ID key into a second medium, the method comprising the steps of: recording temporarily information about the media ID of the first medium in a predetermined memory other than the first and second media, recording the enciphered contents information and the enciphered key information the second medium, and deleting the enciphered key information from the first medium; and recording, in the second medium, independent ID information comprised of information about media ID of the second medium and media ID of the first medium recorded temporarily in the memory and deleting, from the memory, information about media ID of the first media recorded temporarily.

Further, to achieve the above object, there is provided a contents information recording method for recording enciphered contents information and enciphered key information from a first medium which records the enciphered contents information enciphered with a predetermined contents key and enciphered key information obtained by enciphering the contents key with information about media ID of the first medium as an ID key into a second medium, the method comprising the steps of: recording temporarily information about media ID of the first medium in a predetermined memory other than the first and second media in a condition that the information about the media ID corresponds to data link ID; recording the enciphered contents information, the enciphered key information and the data link ID in the second medium and deleting the enciphered key information from the first medium; and obtaining, based on the data link read out from the second medium, information about media ID of the first medium recorded temporarily in the memory, recording independent ID information comprised of information about media ID of the first medium and information about media ID of the second medium in the second medium, and deleting, from the memory, the information about media ID of the first medium recorded temporarily.

Still further, to achieve the above object, there is provided a contents information recording method for recording enciphered contents information and enciphered key information from a first medium which records the enciphered contents information enciphered with a predetermined contents key and enciphered key information obtained by enciphering the contents key with information about media ID of the first medium as an ID key into a second medium, the method comprising the steps of: recording temporarily information about media ID of the first medium and the enciphered key information in a predetermined memory other than the first and second media in a condition that the information about the media ID and the enciphered key information correspond to data link ID; recording the enciphered contents information, the enciphered key information and the data link ID in the second medium and deleting the enciphered key information from the first medium; obtaining, based on the data link ID read out from the second medium, information about media ID of the first medium recorded temporarily in the memory and the enciphered key information; and comparing the enciphered key information read from the second medium and the enciphered key information read from the memory with each other, and only when the two enciphered key informations coincide, recording independent ID information comprised of information about media ID of the second medium and information about media ID of the first medium read out from the memory in the second medium and deleting, from the memory, information about media ID of the first medium recorded temporarily and the enciphered key information.

According to a preferred embodiment of the present invention, information about media ID of the first media recorded temporarily in the memory is information based on media ID of the first medium read out from the first medium, and information about media ID of the second media is information based on media ID of the second medium read out from the second medium.

According to another preferred embodiment of the present invention, the independent ID information is differential ID information which is a differential value between media ID of the first medium and media ID of the second medium.

According to still another preferred embodiment of the present invention, the predetermined contents key is common key or public key, and the ID key is common key using media ID of the first medium or common key using information obtained by converting the media ID of the first medium with a predetermined function.

To achieve the above object, there is provided a contents information processing unit comprising: a memory for temporarily storing information about media ID of a first medium; an independent ID information forming means for forming independent ID information from information about media ID of a second medium and information about media ID of the first medium recorded temporarily in the memory and recording the independent ID information in the second medium; and a deleting means for, after the independent ID information is formed, deleting, from the memory, information about media ID of the first medium recorded temporarily.

According to a preferred embodiment of the present invention, information about media ID of the first media recorded temporarily in the memory is information based on media ID of the first medium read out from the first medium, and information about media ID of the second media is information based on media ID of the second medium read out from the second medium.

According to another preferred embodiment of the present invention, the independent ID information is differential ID information which is a differential value between media ID of the first medium and media ID of the second medium.

To achieve the above object, there is provided a contents information processing unit for processing information about ID of each medium upon recording enciphered contents information and enciphered key information from a first medium which records the enciphered contents information enciphered with a predetermined contents key and enciphered key information obtained by enciphering the contents key with information about media ID of the first medium as an ID key into a second medium, the contents information processing unit comprising: a memory for temporarily storing information about media ID of the first medium; an independent ID information forming means for forming independent ID information from information about media ID of the second medium and information about media ID of the first medium recorded temporarily in the memory and after the enciphered contents information and the enciphered key information are recorded in the second medium, recording the independent ID information in the second medium; and a deleting means for, after the independent ID information is formed, deleting, from the memory, information about media ID of the first medium recorded temporarily.

Further, to achieve the above object, there is provided a contents information processing unit for processing information about ID of each medium upon recording enciphered contents information and enciphered key information from a first medium which records the enciphered contents information enciphered with a predetermined contents key and enciphered key information obtained by enciphering the contents key with information about media ID of the first medium as an ID key into a second medium, the contents information processing unit comprising: a memory for temporarily recording information about media ID of the first medium in a condition that the information about the media ID corresponds to data link ID; a data link ID writing means for recording the data link ID into the first medium; an independent ID information forming means for, after the enciphered contents information, the enciphered key information and the data link ID are recorded into the second medium, obtaining information about media ID of the first medium recorded temporarily in the memory based on the data link ID read out from the second medium, forming independent ID information from information about media ID of the first medium and information about media ID of the second medium, and recording the independent ID information in the second medium; and a deleting means for, after the independent ID information is formed, deleting, from the memory, information about media ID of the first medium recorded temporarily.

Still further, to achieve the above object, there is provided a contents information processing unit for processing information about ID of each medium upon recording enciphered contents information and enciphered key information from a first medium which records the enciphered contents information enciphered with a predetermined contents key and enciphered key information obtained by enciphering the contents key with information about media ID of the first medium as an ID key into a second medium, the contents information processing unit comprising: a memory for temporarily recording information about media ID of the first medium and the enciphered key information in a condition that the information about the media ID and the enciphered key information correspond to data link ID; a data link ID writing means for recording the data link ID into the first medium; a memory reading means for, after the enciphered contents information, the enciphered key information and the data link ID are recorded in the second medium, reading out, based on the data link ID read out from the second medium, information about media ID of the first medium recorded temporarily and the enciphered key information from the memory; an enciphered key information comparing means for comparing the enciphered key information read out from the second medium with the enciphered key information read out from the memory by the memory reading means; an independent ID information forming means for, only when the enciphered key information comparing means determines that the two enciphered key informations coincide, forming independent ID information from information about media ID of the second medium and information about media ID of the first medium, and recording the independent ID information in the second medium; and a deleting means for, after the independent ID information is formed, deleting, from the memory, information about media ID of the first medium recorded temporarily and the enciphered key information.

According to a preferred embodiment of the present invention, information about media ID of the first media recorded temporarily in the memory is information based on media ID of the first medium read out from the first medium, and information about media ID of the second media is information based on media ID of the second medium read out from the second medium.

According to another preferred embodiment of the present invention, the independent ID information is differential ID information which is a differential value between media ID of the first medium and media ID of the second medium.

According to still another preferred embodiment of the present invention, the predetermined contents key is common key or public key and the ID key is common key using media ID of the first medium or common key using information obtained by converting the media ID of the first medium with a predetermined function.

To achieve the above object, there is provided a contents information recording method for recording enciphered contents information and enciphered key information from a first medium which records the enciphered contents information enciphered with a predetermined contents key and enciphered key information obtained by enciphering the contents key with information about media ID of the first medium as an ID key into a second medium, the method comprising the steps of: recording temporarily information about the media ID of the first medium in a predetermined memory other than the first and second media, recording the enciphered contents information and the enciphered key information in backup medium from the first medium, and deleting the enciphered key information from the first medium; recording the enciphered contents information and the enciphered key information in the second medium from the backup medium; and recording, in the second medium, independent ID information comprised of information about media ID of the second medium and media ID of the first medium recorded temporarily in the memory, and deleting, from the memory, information about media ID of the first media recorded temporarily.

To achieve the above object, there is provided a contents information processing unit for processing information about ID of each medium upon recording enciphered contents information and enciphered key information from a first medium which records the enciphered contents information enciphered with a predetermined contents key and enciphered key information obtained by enciphering the contents key with information about media ID of the first medium as an ID key through a backup medium into a second medium, the contents information processing unit comprising: a memory for temporarily storing information about media ID of the first medium; an independent ID information forming means for forming independent ID information from information about media ID of the second medium and information about media ID of the first medium recorded temporarily in the memory, and after the enciphered contents information and the enciphered key information are recorded in the second medium from the backup medium, recording the independent ID information in the second medium; and a deleting means for, after the independent ID information is formed, deleting, from the memory, information about media ID of the first medium recorded temporarily.

Further, to achieve the above object, there is provided a backup media, wherein enciphered contents information enciphered with a predetermined contents key, enciphered key information obtained by enciphering the contents key with information about media ID of other media as ID key, and data link ID which is information about link destination to information about media ID of other media are recorded.

To achieve the above object, there is provided a contents information deciphering method for obtaining contents information by decryption from a medium in which enciphered contents information enciphered with a predetermined contents key, enciphered key information obtained by enciphering the contents key with information about media ID of other media as ID key, and independent ID information formed from information about media ID of the other media and information about media ID of a proper medium are recorded, the contents information deciphering method comprising: obtaining information about media ID of the other media from the independent ID information and media ID of the proper media and thereby deciphering the enciphered key information to obtain the contents key; and deciphering the enciphered contents information using the contents key.

According to a preferred embodiment of the present invention, information about media ID of the other media for forming the independent ID information is information based on media ID of other media read out from the other media, and information about media ID of the proper media for forming the independent ID information is information based on media ID of the proper media read out from the proper media.

To achieve the above object, there is provided a contents information deciphering unit for obtaining contents information by decryption from a medium in which enciphered contents information enciphered with a predetermined contents key, enciphered key information obtained by enciphering the contents key with information about media ID of other media as ID key, and independent ID information formed from information about media ID of the other media and information about media ID of a proper medium are recorded, the contents information deciphering unit comprising: a contents key deciphering means for obtaining information about media ID of the other media from the independent ID information and media ID of the proper media and thereby deciphering the enciphered key information to obtain the contents key; and a contents information deciphering means for deciphering the enciphered contents information using the contents key.

According to a preferred embodiment of the present invention, information about media ID of the other media for forming the independent ID information is information based on media ID of other media read out from the other media, and information about media ID of the proper media for forming the independent ID information is information based on media ID of the proper media read out from the proper media.

To achieve the above object, there is provided a media, wherein enciphered contents information enciphered with a predetermined contents key, enciphered key information obtained by enciphering the contents key with information about media ID of other media as ID key, and independent ID information formed from information about media ID of the other media and information about media ID of a proper medium are recorded.

According to a preferred embodiment of the present invention, information about media ID of the other media for forming the independent ID information is information based on media ID of other media read out from the other media, and information about media ID of the proper media for forming the independent ID information is information based on media ID of the proper media read out from the proper media.

The nature, principle and utility of the invention will become more apparent from the following detailed description when read in conjunction with the accompanying drawings.

DESCRIPTION OF THE PREFERRED EMBODIMENTS

Figure 2:
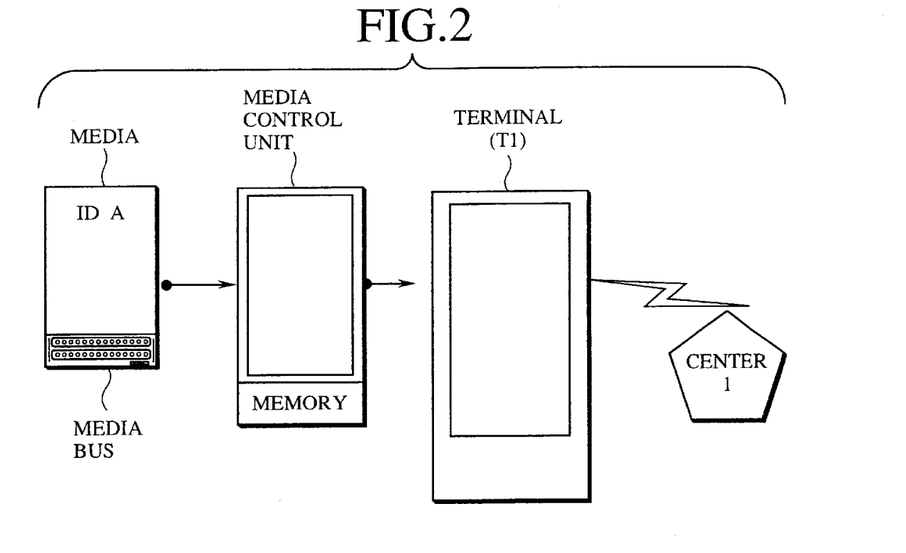
FIG. 2 is a diagram showing a configuration of system according to an embodiment.

First, an embodiment of the configuration of the present invention will be described with reference to FIG. 2. An medium has an ID inherent of itself and can be set in a media control unit. The media mentioned here needs to enable recording and reproduction and include a solid memory, disc, tape and the like as long as its inherent ID can be set therein. In this case, the ID information must have a predetermined tamper resistance. That is, it is desirable that the ID and a key necessary for encryption are in a storage condition making it difficult to read or rewrite them illegally.

The simplest example is a memory type. By using it, a memory card from which the ID or enciphered key information cannot be extracted unless a predetermined memory control unit is used can be produced easily with safety. An inherent ID is recorded in each memory card at the time of production in plant. Alternatively, when the memory card is published by a publicizing unit, an ID inherent of that memory is recorded in EEPROM or the like and the EEPROM is buried by sealing resin or the like. As a result, user corresponding information cannot be changed after that. That is, illegal change is prevented. The medium has a media bus allowing only part of data to be duplicated between media.

A media control unit in which a medium is set and which is connected to a terminal of PC or other specialized device has an interface function between the medium and terminal, and functions for enciphering and deciphering of data under a predetermined ID. The media control unit has tamper resistance inhibiting illegal access to inside of the memory from the terminal. The terminal is connected to a center disposed outside for distributing contents information (distribution center) and distributes the contents data after predetermined procedures for accounting, certification and the like are finished. Connecting means to the center includes ISDN, broadcasting, cable TV and radio as well as network system like internet.

Figure 1:
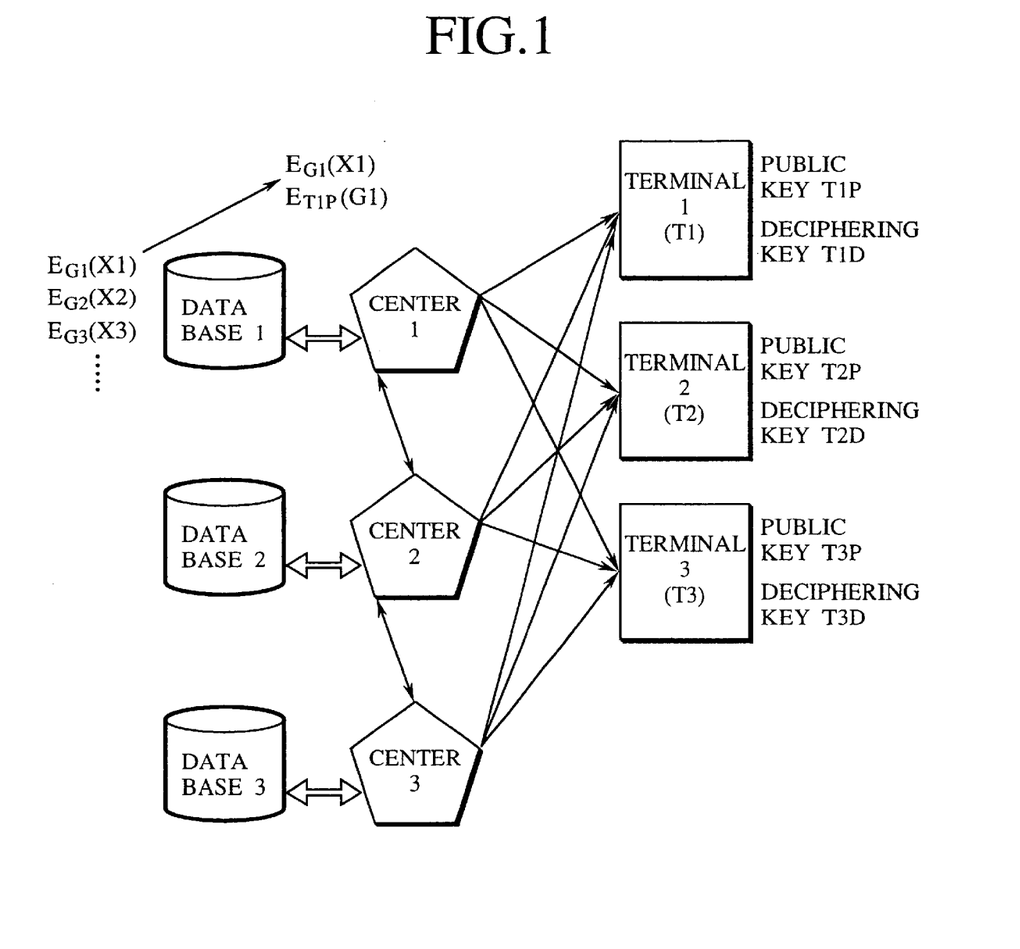
FIG. 1 is a diagram for explaining encryption at the time of data distribution for use in an embodiment.

The contents information is enciphered with a basically different key (contents key) depending on the contents. After compressed in a predetermined compression system like MPEG, the contents are subject to encryption based on DES (data encryption standard) or the like. For example, in case of the DES, the enciphering key is about 64 bits. FIG. 1 shows a relation between the data base, center and terminal. The contents information, for example, contents X1 are enciphered with an enciphering key G1 in data base installed in the center and other contents X2 are enciphered with an enciphering key G2.

A plurality of terminals are connected to this center via network. Transmission to the terminal is carried out in encryption by public key system considering the security. Here, assuming that the public key of the terminal 1 (T1) is T1P and the deciphering key is T1D, contents X1 managed by the data base 1 are enciphered with enciphering key G1 so as to produce enciphered contents information called $E_{G1}(X1)$. The enciphering key G1 is enciphered with the public key T1P of the terminal T1 to transmit to the terminal T1 so that this key is converted to enciphered key information $E_{T1P}(G1)$. Then, both the enciphered contents information $E_{G1}(X1)$ and enciphered key information $E_{T1P}(G1)$ are sent to the terminal 1 (T1).

To reproduce the contents information at the terminal 1, the enciphered key information $E_{T1P}(G1)$ is deciphered with the deciphering key T1D of the terminal 1 to obtain the enciphering key G1. Then, the enciphered contents information $E_{G1}(X1)$ is deciphered with that enciphering key G1 to obtain contents X1 and then MPEG expanding or the like is carried out to reproduce the original information. However, in a description made in this specification, it is assumed that transmitted data is not reproduced but recorded in media connected to the terminal. Although data transmission up to the terminal with the public key has been described here, the present invention can be supported not only by the common key system but also other system.

Figure 3:
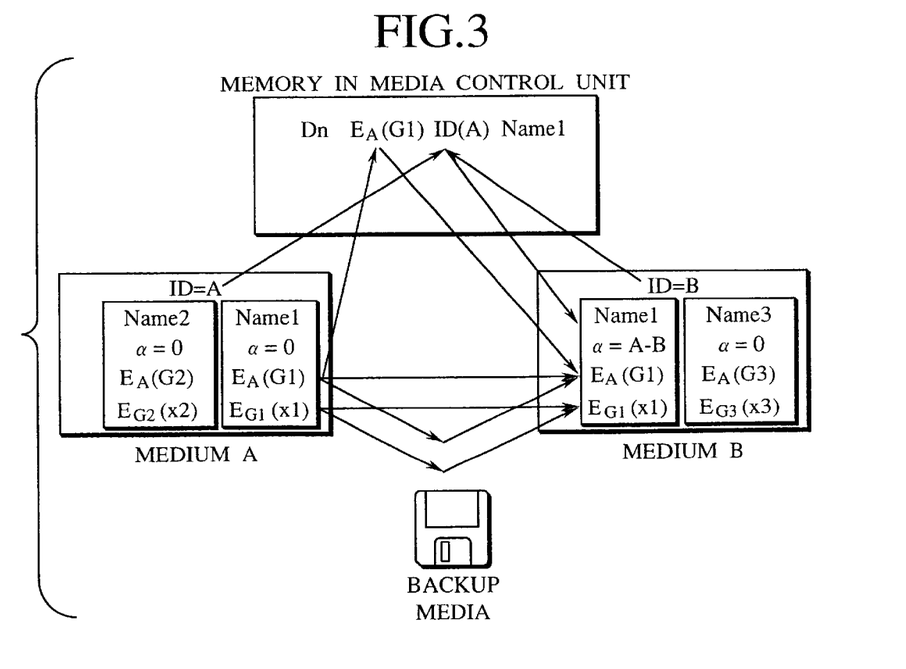
FIG. 3 is a diagram for explaining functions of an embodiment.

Next, transmission and reception function for the contents information and key information according to an embodiment of the present invention will be described with reference to FIGS. 3, 4 and 5.

First, a case in which contents data is received by medium A (first medium) of the terminal T1 from the distribution center will be described. First of all, medium A is set in the media control unit. Then, the media control unit is set in the terminal T1 and "data recording modes" is turned ON. Predetermined processings for accounting, certification and the like are carried out. When the processings are terminated, the contents data is distributed from the center to the terminal in an enciphered state with the enciphering key G1.

That is, the enciphered contents information $E_{G1}(X1)$ in which the contents X1 are enciphered with the enciphering key G1 is sent. At the same time, to send the enciphering key G1 to the terminal T1, enciphered key information $E_{T1P}(G1)$ in which the enciphering key G1 is enciphered with the public key T1P of the terminal T1 is sent to the terminal T1. Because a key for use in deciphering at the terminal is deciphering key T1D, this enciphered key information $E_{T1P}$(G1) can be deciphered with the deciphering key T1D. A condition which can be deciphered with this deciphering key T1D is called $E_{T1D}$(G1) instead of $E_{T1P}$(G1). At the terminal, this enciphered key information $E_{T1D}$(G1) is deciphered with the deciphering key T1D once to obtain the enciphering key G1.

The media control unit receives the enciphered contents information $E_{G1}$(X1) and enciphering key G1 from the terminal and records the enciphered contents information $E_{G1}$(X1) in media A. On the other hand, the media control unit recognizes a media ID set up and enciphers this enciphering key G1 with a value A which is an inherent ID of the media A so as to obtain enciphered key information $E_A$(G1), and records it in the media A. Contents of the media A at this point of time is shown in block of media A of FIG. 3. α is a differential ID (independent ID information) which will be described later and at this time, α=0 is recorded. Section (1) in FIG. 4 shows a data structure just after data is distributed. In data, differential ID 64 bits is recorded at a head thereof followed by enciphered key information 64 bits and enciphered contents information in this order.

Next, a case for reproducing the enciphered contents information recorded in the media A will be described. The media A is set in the media control unit and the media control unit is set to "data reproduction mode". The enciphered key information $E_A$(G1) is deciphered to the enciphering key G1 using a value in which α is added to A which is its own ID and then, the enciphered contents information $E_{G1}$(X) is deciphered with the enciphering key G1 so as to obtain reproduction data X. Because α=0 here, this is equivalent to a case in which the deciphering is carried out with ID=A.

Next, a case in which data is transferred (moved) from medium A (first medium) to medium B (second medium) will be described. When the enciphered contents information is transferred from a transfer source medium A in which the contents are recorded to a transfer destination media B, first, the media A is set in the media control unit. Then, mode in the media control unit is changed to "data move mode".

The enciphered key information $E_A$(G1) and transfer source medium A (first medium) ID are stored temporarily in memory of the media control unit such that they correspond to data link ID. As shown in a block of memory in the media control unit of FIG. 3, Dn as a control number is selected as data link ID. This control number may be determined serially when it is from 0 to 64 bits. When this number can be controlled reasonably when the data link ID is deleted as described later, any notation system can be used. With the Dn, the enciphered key information $E_A$(G1), ID of the media A, contents name and the like are recorded. Considering that plural contents are recorded in the media A, data related to this Dn such as file name are recorded.

The aforementioned data link ID is added to the enciphered contents information $E_{G1}$(X1) and duplicated to the destination medium with the enciphered key information $E_A$(G1). The enciphered contents information and enciphered key information $E_A$(G1) are transferred to medium B rapidly through the media bus. This media bus connects the medium A to the medium B physically and sends data not through the media control unit. A high security is ensured because only enciphered contents data can pass through this media bus. Section (2) in FIG. 4 shows enciphered contents information structure. After the enciphered contents information $E_{G1}$(X1) and enciphered key information $E_A$(G1) are transmitted from the medium A to the medium B, the enciphered key information $E_A$(G1) in the transfer source medium A is deleted. Although when the security is considered, it is desirable to delete the enciphered contents information $E_{G1}$(X1) also, it can be considered that deciphering of the enciphered information is substantially impossible when only the enciphered key information $E_A$(G1) is deleted.

The inside of the media and media control unit cannot be accessed illegally using external backup media or a PC terminal and a command for deletion of information or the like is carried out securely.

Next, the medium B is set up in the media control unit. The media control unit reads ID of the transfer destination medium B and then, reads Dn of the data link ID attached to the enciphered contents information $E_{G1}$(X1) already transferred. Because the media control unit is in "data move modes" at this time, data recorded in the same area as differential ID can be recognized as Dn of the data link ID. Based thereon, the enciphered key information $E_A$(G1) and ID(A) of transfer source medium ID corresponding to Dn of the data link ID are read out from a memory in the media control unit.

Here, $E_A$(G1) read out from the transfer destination medium B is compared with $E_A$(G1) read from the control unit memory. Unless these key informations do not coincide with each other, the differential ID is not issued. That is, when they do not coincide with each other, even when the data link ID is the same, they can be recognized as different contents informations. This is useful for avoiding a problem which may occur when data is moved from the same medium A using plural media control units or finding a contradiction which occurs in data in the media control unit when illegal duplication is tried or when it is tried to change data in the medium illegally, so as to stop the function.

Next, when agreement is certified, a differential ID which is a differential value between the transfer destination medium B ID and transfer source medium A ID, namely, (A−B) value is recorded in the transfer destination medium B. After the recording, the aforementioned enciphered key information $E_A$(Ga) and transfer source medium A ID(A), recorded in the memory of the media control unit are deleted. Contents of the media B at this time is shown in block of the medium B of FIG. 3.

This deletion motion enables not duplication of data between media but transfer (move) of data. Although encryption with ID is originally very effective, this has such a disadvantage that data cannot be reproduced in others than that media. However, by managing enciphered key information and media ID information in a media control unit impossible to control from outside and deleting at the same time when duplication is executed, it is possible to provide a user-oriented system easy to use. Data structure after data move is shown in section (3) of FIG. 4. After the data move is completed, the beginning 64-bit data link ID information is changed to data information of differential ID.

Next, a case for reproducing the enciphered contents information $E_{G1}$(X1) which is moved to the medium B will be described. The reproduction procedure is the same as a procedure for reproducing the medium A after the aforementioned distribution. That is, to reproduce the enciphered contents information recorded in this medium B, the medium B is set in the media control unit and the media control unit is set to "reproduction mode". The enciphered key information $E_A$(G1) is deciphered to the enciphering key G1 using a value in which α is added to its own ID, B, that is B+(A−B) and then, the enciphered contents information $E_{G1}$(X1) is deciphered using the enciphering key G1 to obtain reproduction data X1. Because α which is the differential ID is equal to A–B, this is equivalent to a case in which the deciphering is done using ID=A, so that the reproduction is enabled.

Next, a case in which the enciphered contents information is duplicated from the transfer source medium A in which the contents are recorded, to a backup media will be described. The backup media generally refers to media which cannot be loaded on or unloaded from the media control unit. That is, this includes hard disk of PC and recordable optical disk, and the like, which has no proper control system. Here, a hard disk connected to the terminal PC is assumed to be backup media.

First, the medium A is set in the media control unit and the media control unit is set to "backup output mode". The media control unit is connected to PC terminal. The enciphered key information $E_A(G1)$ and transfer source medium A ID are recorded in memory of the media control unit in a condition that they correspond to data link ID. As shown in memory block of the media control unit of FIG. 3, a control number as Dn is selected as data link ID. With this Dn, the enciphered key information $E_A(G1)$ and medium A ID are recorded. The aforementioned data link ID is attached to the enciphered contents information $E_{G1}(X1)$ and transmitted to a hard disk connected to the terminal PC with the enciphered key information $E_A(G1)$ through the media control unit.

Next, a case in which the enciphered contents information is duplicated from the backup media in which the contents are recorded, to the transfer destination medium media B will be described. First, the media B is set in the media control unit and the media control unit is set to "backup input modem". The media control unit is connected to the PC terminal. Head 64 bits of the enciphered contents data recorded in the backup media is always data link Dn. The enciphered contents information $E_{G1}(X1)$ to which the aforementioned data link ID is attached and enciphered key information $E_A(G1)$ are duplicated to the transfer destination medium B.

The media control unit reads ID(B) of the connected transfer destination medium, reads data link ID attached to the enciphered contents information $E_{G1}(X1)$ and reads the enciphered key information $E_A(G1)$. Based thereon, the enciphered key information $E_A(G1)$ corresponding to the data link ID and transfer source medium media ID(A) are read out from memory of the media control unit and then, the enciphered key information read out from the transfer destination medium B is compared to the enciphered key information $E_A(G1)$ read out from the control memory.

When agreement is certified, a differential ID which is a differential value between the transfer destination medium B ID and transfer source medium A ID, namely, (A–B) value is recorded in the transfer destination medium B. Then, after the recording is completed, the aforementioned enciphered key information $E_A(G1)$ and transfer source medium media ID(A) recorded in the memory of the media control unit are deleted. An operation of backing up from the medium A to the backup media temporarily and after that moving it to the medium B is equivalent to an operation of moving data directly from the medium A to the medium B.

A case in which the enciphered contents information $E_{G1}(X1)$ moved from the backup media to the medium B is reproduced is equal to the aforementioned procedure for reproducing medium A after the distribution of data. That is, when the enciphered contents information $E_{G1}(X1)$ recorded in this medium B is reproduced, the medium B is set in the media control unit and the media control unit is set to "data reproduction mode". The enciphered key information $E_A(T1D)$ is deciphered to the enciphering key G1 using a value in which α is added to B of its own ID, that is, B+(A–B) and then, the enciphered contents information $E_{G1}(X)$ is deciphered with the enciphering key G1 to obtain the reproduction data X. Because α of the differential ID is equal to A–B, this is equivalent to a case in which the deciphering is done with ID=A, so that the reproduction is enabled.

Although it is assumed that the enciphered contents information is enciphered in public key system in the above description, data may be distributed from the center with a common key G of the terminal and deciphered with the deciphering key G at the terminal. Although it is assumed that the key is enciphered with ID inherent of media in the above description, data may be enciphered with not ID itself but information obtained by converting the ID with a predetermined function.

Figure 6:
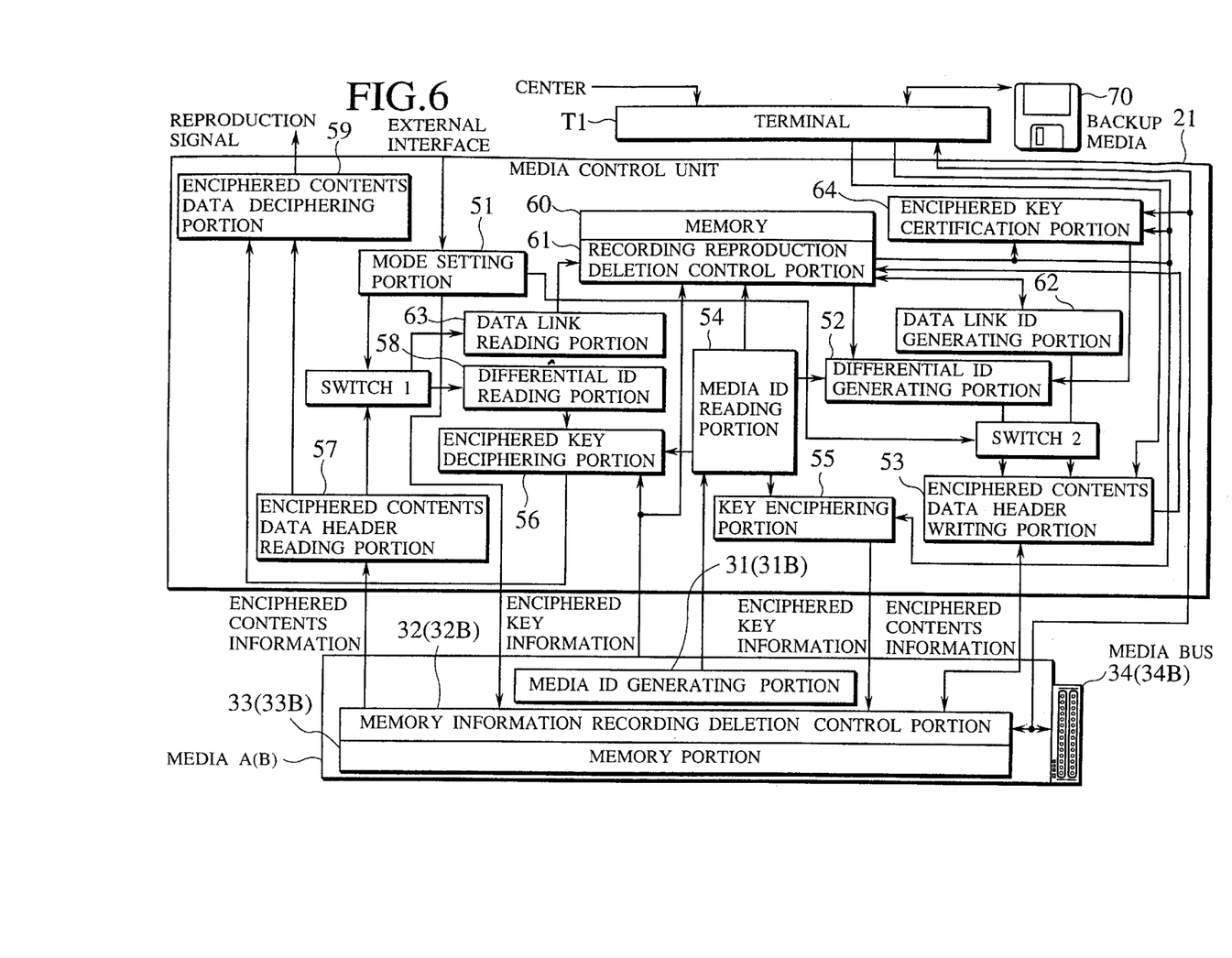
FIG. 6 is a block diagram showing a detailed structure of an embodiment.

Next, a block diagram of an embodiment of the present invention will be described with reference to FIG. 6.

First, a case in which the contents data is received by the medium A from the distribution center will be described. First, the medium A is set in the media control unit 21. The media control unit is set to the terminal T1 and "data recording mode" is set in a mode setting portion 51 of the media control unit from an external interface. After predetermined procedures for accounting, certification and the like are terminated, contents data enciphered with a predetermined enciphering key (contents key) G1 is distributed from the center to the terminal T1. In case of "data recording mode", the mode setting portion 51 instructs a differential ID generating portion 52 to generate "0". The media control unit receives the enciphered contents data and the enciphered contents data header writing portion 53 writes 64-bit data indicating 0 into the header so that the enciphered contents information $E_{G1}(X1)$ is recorded in the memory portion 33 of the medium A. When "data recording mode" is set up in the mode setting portion 51, a switch 2 is changed so as to connect the differential ID generating portion 52 to the enciphered contents data header writing portion 53.

On the other hand, a signal generated by a media ID generating portion 31 of the media side is detected as media ID(A) by a media ID reading portion 54 of the media control unit. The contents enciphering key G1 is enciphered by a key enciphering portion 55 with this ID(A) so as to create the enciphered key information $E_A(G1)$ and it is recorded in the memory portion 33 through a memory information record deletion control portion 32 of the media. The header indicates a differential ID and at this time, 0 is recorded there. Section (1) in FIG. 4 shows data structure just after the distribution. Differential ID 64 bits is recorded at the head followed by the enciphered key information 64 bits and then the enciphered contents information.

Next, a case in which the enciphered contents information $E_{G1}(X1)$ recorded in the media A is reproduced will be described. The media A is set in the media control unit 21 and "data reproduction mode" is set in the mode setting portion 51 of the media control unit from an external interface. The media control unit 21 reads out the enciphered key information $E_A(G1)$ from the memory portion 33 of the media A and sends it to an enciphered key deciphering portion 56. A signal generated by the media ID generating portion 31 of the media is detected by the media ID reading portion 54 of the media control unit as media ID(A) and sent to the enciphered key deciphering portion 56. The media control unit 21 reads out the enciphered contents information $E_{G1}(X1)$ from the memory portion 33 of the media through the memory information record deletion control portion 32 and that enciphered contents information $E_{G1}(X1)$ is sent to an enciphered contents data header reading portion 57. The enciphered contents data header reading portion 57 reads out differential data of 64 bits at the head and send it to a differential ID reading portion 58 through a switch 1.

In case of "data reproduction mode", the switch 1 is changed by the mode setting portion 51 so as to input data from the enciphered contents data header reading portion 57 into the differential ID reading portion 58. A differential ID detected by the differential ID reading portion 58 is sent to the enciphered key deciphering portion 56. The enciphered key deciphering portion 56 adds the inputted differential ID to the media ID so as to produce ID, so that the enciphering key G1 is obtained by deciphering. Because the differential ID is equal to 0, this is equivalent to a case in which the deciphering is done with ID=A. The obtained enciphering key G1 is sent to the enciphered contents data header deciphering portion 59. Further, enciphered contents data whose header is removed by the enciphered contents data header reading portion 57 is sent to the enciphered contents deciphering portion 59. The enciphered contents data deciphering portion 59 deciphers the enciphered contents data $E_{G1}(X1)$ with the inputted enciphering key G1 and outputs as reproduction data.

Next, a case in which data is transferred (moved) from the medium A to the medium B will be described. When the enciphered contents information is duplicated from the transfer source medium A in which the contents are recorded to the transfer destination medium B, first, the medium A is set in the media control unit 21. Then, "data move output mode" is set in the mode setting portion 51 of the media control unit from an external interface.

A signal generated by the media generating portion 31 is detected by the media ID reading portion 54 of the media control unit as media ID(A) and sent to a recording reproduction deletion control portion 61 in the memory 60 of the media control unit. At the same time, the enciphered key information $E_A(G1)$ is called from the medium A and sent to the recording reproduction deletion control portion 61 in the memory 60 of the media control unit. Further, data link ID is generated in the data link ID generating portion 62 and sent to the recording reproduction deletion control portion 61 in the memory 60 of the media control unit. The enciphered key information $E_A(G1)$ and transfer source medium media A ID are recorded in the memory 60 of the media control unit in a condition that they correspond to the data link ID. When the data link ID is deleted as described later, the deleted information is transmitted to the data link ID generating portion so as to generate an ID which can be managed without contradiction.

The data link ID generating portion 62 sends data link ID to the enciphered contents data header writing portion 53 at the same time. When "data move output mode" is set in the mode setting portion 51, the switch 2 is changed so that the data link ID generating portion 62 is connected to the enciphered contents data header writing portion 53. The enciphered contents data header writing portion 53 reads the enciphered contents data from the memory portion 33 of the media A, writes the data link ID into the header and returns the data to the memory 33 of the medium.

The returned enciphered contents data is stored in a region for moving data with the enciphered key information and sent to the medium B rapidly through the media bus 34. This media bus 34 connects the medium A to the medium B physically so as to carry out data transmission not through the media control unit. A high security is ensured because only the enciphered contents data can pass through this media bus.

After that, the memory information record deletion control portion 32 of the medium recognizes that the set mode is "data move output mode" and deletes the enciphered key information $E_A(G1)$ existing in the transfer source medium A.

Next, the medium B is set in the media control unit 21. A media ID(B) is detected by the media ID reading portion 54 of the media control unit. Then, the enciphered contents information $E_{G1}(X1)$ already recorded in the memory portion 32B of the medium B is transmitted to the enciphered contents data header reading portion 57. Further, the enciphered key information $E_A(G1)$ recorded in the medium B is also read.

When "data input move mode" is set in the mode setting portion 51, the switch 1 is changed so that data is inputted from the enciphered contents data header reading portion 57 into the data link ID reading portion 63. The data link ID reading portion 63 reads a data link ID attached to the header of the enciphered contents information $E_{G1}(X1)$ and sends it to the recording reproduction deletion control portion 61 of the memory 60 in the media control unit. The recording reproduction deletion control portion 61 reads, based on this data link ID, the enciphered key information $E_A(G1)$ which corresponds to Dn of the data link ID and ID(A) which is transfer source medium ID from the memory 60 of the media control unit.

Here, the enciphered key information $E_A(G1)$ read out from the transfer destination medium B and the enciphered key information $E_A(G1)$ read out from the media control unit memory 60 are sent to an enciphering key certifying portion 64 and compared with each other. Unless these key informations coincide with each other, no differential ID is issued. A comparison result is sent to the differential ID generating portion 52 and when the key informations coincide with each other as a result of the comparison, ID(A) is sent to the differential ID generating portion 52. The differential ID generating portion 52 calculates a difference between the inputted ID(A) and ID(B) of the transfer destination medium read by the media ID reading portion 54 and sends a differential ID(A–B) to the enciphered contents data header writing portion 53.

When "data input move modes" is set in the mode setting portion 51, the switch 2 is changed so that the differential ID generating portion 52 is connected to the enciphered contents data header writing portion 53. The enciphered contents data header writing portion 53 rewrites a header of enciphered contents data having data link ID of an object to the differential ID value.

After that, the enciphered contents data header writing portion 53 outputs a write completion signal to the recording reproduction deletion control portion 61 of the memory 60 in the media control unit. The recording reproduction deletion control portion 61 deletes the aforementioned enciphered key information $E_A(G1)$ and ID(A) of the transfer source medium. Section (3) in FIG. 4 shows data structure after data move. After the data move is completed, beginning 64-bit data link ID information is rewritten as data information of the differential ID.

Next, a case in which the enciphered contents information moved to the medium B is reproduced will be described. The reproduction procedure is the same as a procedure for reproducing the medium A. That is, when the enciphered contents information $E_{G1}(X1)$ recorded in this medium B is reproduced, the medium B is set in the media control unit 21 and then, the media control unit is set to "data reproduction mode". The media control unit 21 reads out the enciphered key information $E_A(G1)$ from the memory portion 33B and sends it to the enciphered key deciphering portion 56. A signal generated by a media ID generating portion 31B of the media is detected as media ID(B) by the media ID reading portion 54 of the media control unit and sent to the enciphered key deciphering portion 56. Further, the media control unit 21 reads the enciphered contents information $E_{G1}(X1)$ from the memory portion 33B of the medium B and that enciphered contents information $E_{G1}(X1)$ is sent to the enciphered contents data header reading portion 57. The enciphered contents data header reading portion 57 reads differential data of 64 bits at the head and that differential data is sent to the differential ID reading portion 58 through the switch 1.

In case of "data reproduction mode", the switch 1 is changed so that data from the enciphered contents data header reading portion 57 is inputted into the differential ID reading portion 58 by the mode setting portion 51. The differential ID detected by the differential ID reading portion 58 is sent to the enciphered key deciphering portion 56. The enciphered key deciphering portion 56 sums up the inputted differential ID and media ID to generate ID and then obtain the enciphering key G1 by deciphering. Because the differential ID is equal to A=B, this is equivalent to the case in which the deciphering is done with ID=B+(A−B) or ID=A. The obtained enciphering key G1 is sent to the enciphered contents data deciphering portion 59. Further, the enciphered contents data $E_{G1}(X1)$ whose header is removed by the enciphered contents data header reading portion 57 is sent to the enciphered contents deciphering portion 59. The enciphered contents deciphering portion 59 deciphers the enciphered contents data $E_{G1}(X1)$ with the enciphering key G1 and outputs as reproduction data.

Next, a case in which the enciphered contents information is duplicated from the transfer source medium A in which the contents are recorded into a backup medium 70 will be described.

First, the medium A is set in the media control unit 21. Then, "backup output mode" is set in the mode setting portion 51 of the media control unit from an external interface. The media control unit 21 is connected to the terminal T1. The terminal T1 is connected to the backup media 70.

A signal generated by the media ID generating portion 31 is detected as ID(A) of medium A by the media ID reading portion 54 of the media control unit and sent to the recording reproduction deletion control portion 61 of the memory 60 in the media control unit. At the same time, the enciphered key information is called from the medium A and sent to the recording reproduction deletion control portion 61 of the memory 60 in the media control unit.

Data link ID is generated by the data link ID generating portion 62 and sent to the recording reproduction deletion control portion 61 of the memory 60 in the media control unit. The enciphered key information $E_A(G1)$ and ID of the transfer source medium A are recorded in the memory 60 of the media control unit in a condition that they correspond to data link ID. The data link ID generating portion 62 sends the data link ID to the enciphered contents data header writing portion 53 also at the same time. When "backup output mode" is set in the mode setting portion 51, the switch 2 is changed so that the data link ID generating portion 62 is connected to the enciphered contents data header writing portion 53. The enciphered contents data header writing portion 53 reads the enciphered contents data from the memory portion 33 of the medium A and writes the header link ID into the header. The enciphered contents data $E_{G1}(X1)$ in which the data link ID is written is sent to the backup medium 70 through the terminal T1 with the enciphered key information $E_A(G1)$ read out from the memory portion 33 of the medium A. After that, the enciphered key information $E_A(G1)$ in the transfer source medium A is deleted by the memory information record deletion control portion 32.

Next, a case in which the enciphered contents information is transferred from the backup medium 70 in which the contents are recorded to the transfer destination medium B will be described. First, the medium B is set in the media control unit 21 and the media control unit 21 is set to "backup input mode". ID(B) of the media is detected by the media ID reading portion 54 of the media control unit. Next, the enciphered contents data $E_{G1}(X1)$ and enciphered key information $E_A(G1)$ are read out from the backup media 70 through the terminal T1 and the enciphered contents data $E_{G1}(X1)$ and the enciphered key information $E_A(G1)$ are recorded in the memory portion 33B of the medium B through the enciphered contents data header writing portion 53.

Subsequently, the enciphered contents information $E_{G1}(X1)$ is sent from the memory portion 33B of the medium B to the enciphered contents data header reading portion 57. When "backup input mode" is set in the mode setting portion 51, the switch 1 is changed so that data is inputted from the enciphered contents data header reading portion 57 to the data link ID reading portion 63. The data link ID reading portion 63 reads a data link ID attached to the header of the enciphered contents information $E_{G1}(X1)$ and sends it to the recording reproduction deletion control portion 61 of the memory 60 in the media control unit. Further, the enciphered key information $E_A(G1)$ is read from the memory portion 33B of the medium B. The recording reproduction deletion control portion 61 reads, based on this data link ID, the enciphered key information $E_A(G1)$ which corresponds to Dn of the data link ID and ID(A) which is ID of the transfer source medium from the memory of the media control unit.

Here, $E_A(G1)$ read out from the transfer destination medium B and $E_A(G1)$ read from the control unit memory 60 are sent to the enciphering key certifying portion 64 and compared with each other. Unless the key informations coincide, no differential ID is issued. A comparison result is sent to the differential ID generating portion 52, and when the key informations coincide as a result of the comparison, the ID(A) is sent to the differential ID generating portion.

The differential ID generating portion 52 calculates a difference between the inputted ID(A) and ID(B) of the transfer destination medium read by the media ID reading portion 54 and sends the differential ID (A−B) to the enciphered contents data header writing portion 53. When "backup input mode" is set in the mode setting portion 51, the switch 2 is changed so that the differential ID generating portion 52 is connected to the enciphered contents data header writing portion 53. The enciphered contents data header writing portion 53 rewrites a header of the enciphered contents data $E_{G1}(X1)$ having a data link of an object to a value of the differential ID. After that, the enciphered contents data header writing portion 53 outputs a write. completion signal to the recording reproduction deletion control portion 61 of the memory 60 in the media control unit and the recording reproduction deletion control portion 61 deletes the enciphered key information $E_A(G1)$ and ID(A) of the transfer source medium.

Figure 4:
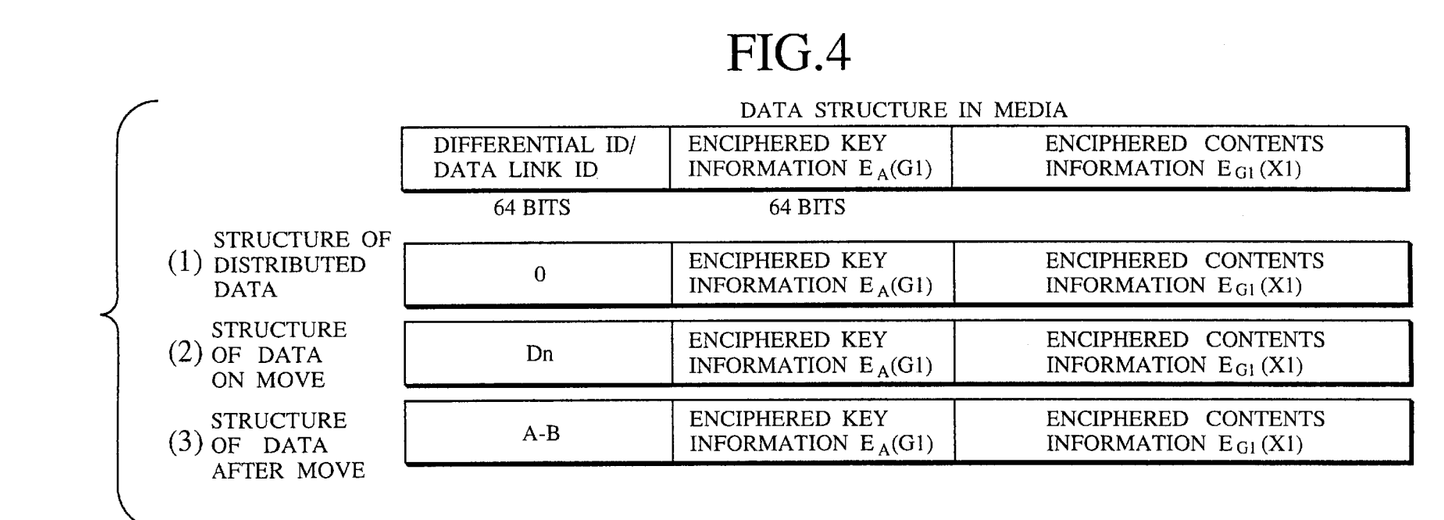
FIG. 4 is a diagram of data structure in media of an embodiment.
Figure 5:
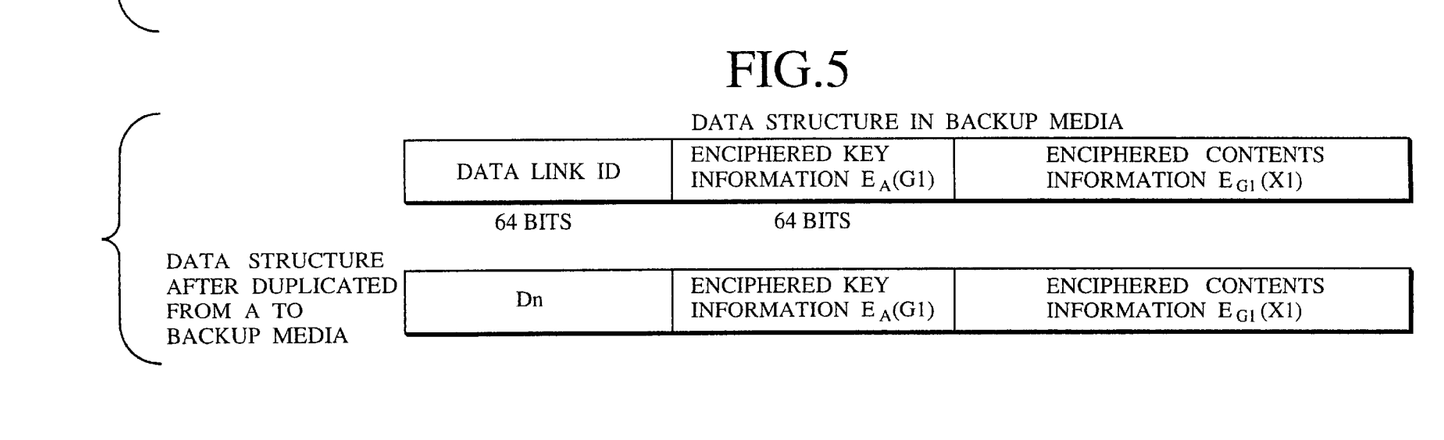
FIG. 5 is a diagram of data structure in backup media of an embodiment.

Section (3) in FIG. 4 shows data structure after data move. After the data move is completed, the beginning 64-bit data link ID information is rewritten as data information of the differential ID.

Next, a case in which the enciphered contents information moved from the backup medium 70 to the medium B will be described. The reproduction procedure is the same as a procedure for reproducing the medium A after the distribution. That is, when the enciphered contents information $E_{G1}(X1)$ recorded in the medium B is reproduced, the medium B is set in the media control unit 21 and then, the media control unit is set to "data reproduction mode".

The media control unit 21 reads the enciphered key information $E_A(G1)$ from the memory portion 33B of the medium B and sends it to the enciphered key deciphering portion 56. Further, a signal generated by the media ID generating portion 31B of the medium is detected as ID(B) of the medium by the media ID reading portion 54 of the media control unit and sent to the enciphered key deciphering portion 56. The media control unit reads the enciphered contents information $E_{G1}(X1)$ from the memory portion 33B of the medium B and that enciphered contents information $E_{G1}(X1)$ is sent to the enciphered contents data header reading portion 57. The enciphered contents data header reading portion 57 reads differential data of 64 bits at the head and sends it to the differential ID reading portion 58 through the switch 1.

When "data reproduction mode" is set by the mode setting portion 51, the switch 1 is changed so that data from the enciphered contents data header reading portion 57 is inputted to the differential ID reading portion 58. The differential ID detected by the differential ID reading portion 58 is sent to the enciphered key deciphering portion 56. The enciphered key deciphering portion 56 sums up the inputted differential ID and media ID to generate an ID and obtains the enciphering key G1 by deciphering. Because the differential ID is equal to A–B, this is equivalent to the case in which the deciphering is done with ID=B+(A–B) or ID=A. The obtained enciphering key G1 is sent to the enciphered contents data deciphering portion 59. The enciphered contents data $E_{G1}(X1)$ whose header is removed by the enciphered contents header reading portion 58 is sent to the enciphered contents data deciphering portion 59. The enciphered contents data deciphering portion 59 deciphers the enciphered contents data $E_{G1}(X1)$ with the enciphering key G1 and outputs it as reproduction data X1.

As described above, the present invention makes it possible to transfer media in which contents data is recorded between users while preventing illegal transfer and duplication, so that user can obtain the contents data without connecting to account control center, data management center or the like.

Further, when user possesses plural media, the present invention makes it possible to provide a system which enables user to move data between the different media while preventing illegal transfer or duplication and is capable of returning the data to any media after backup.

Further, the media has a removable media control unit and the media control unit has a memory. When the enciphered contents information $E_{G1}(X1)$ is moved between media, the enciphered key information $E_A(G1)$ is recorded temporarily in the memory and after the data move is completed, the enciphered key information $E_A(G1)$ is deleted. When the enciphered contents information $E_{G1}(X1)$ is moved to the backup media, the enciphered key information $E_A(G1)$ is recorded in the memory temporarily until that data is returned from the backup media, and at the time of the return, the enciphered key information $E_A(G1)$ is deleted. Thus, data move between media can be carried out freely while illegal duplication of the data to plural media is prevented, when the data is returned to any media after backup.

Further, whether or not the enciphered key information $E_A(G1)$ of the transfer source medium recorded temporarily in memory of the media control unit is the same as the enciphered key information $E_A(G1)$ of the transfer source medium read out from a transfer destination medium is certified, and only when it is certified that they are the same, a differential ID is generated and recorded. Thus, it is possible to avoid a problem which may occur when data move is carried out from the same media A using plural media control units. Further, this certification function is effective for finding out a contradiction which occurs when changing of data in the media control unit memory or data in media is tried in order to duplicate the data illegally and, stopping the function.

The present invention makes it possible to transfer media in which contents data is recorded between users while preventing illegal transfer and duplication, so that user can obtain the contents data without connecting to account control center, data management center or the like.

Further, when user possesses plural media, the present invention makes it possible to provide a system which enables user to move data between the different media while preventing illegal transfer or duplication and is capable of returning the data to any media after backup.

It should be understood that many modifications and adaptations of the invention will become apparent to those skilled in the art and it is intended to encompass such obvious modifications and changes in the scope of the claims appended hereto.

What is claimed is:

1. A contents information recording method for recording enciphered contents information and enciphered key information from a first medium which recorded therein the enciphered contents information enciphered with a predetermined contents key and enciphered key information obtained by enciphering the contents key with information about media ID of the first medium as an ID key into a second medium, the method comprising the steps of:

recording temporarily information about the media ID of the first medium in a predetermined memory other than the first and second media, recording the enciphered contents information and the enciphered key information in the second medium, and deleting the enciphered key information from the first medium; and recording, in the second medium, independent ID information comprised of information about media ID of the second medium and media ID of the first medium recorded temporarily in the memory and deleting, from the memory, information about media ID of the first media recorded temporarily.

2. A contents information recording method for recording enciphered contents information and enciphered key information from a first medium which recorded therein the enciphered contents information enciphered with a predetermined contents key and enciphered key information obtained by enciphering the contents key with information about media ID of the first medium as an ID key into a second medium, the method comprising the steps of:

recording temporarily information about media ID of the first medium in a predetermined memory other than the first and second media in a condition that the information about the media ID corresponds to data link ID;

recording the enciphered contents information, the enciphered key information and the data link ID in the second medium and deleting the enciphered key information from the first medium; and obtaining, based on the data link read out from the second medium, information about media ID of the first medium recorded temporarily in the memory, recording independent ID information comprised of information about media ID of the first medium and information about media ID of the second medium in the second medium, and deleting, from the memory, the information about media ID of the first medium recorded temporarily.

3. A contents information recording method for recording enciphered contents information and enciphered key information from a first medium which recorded therein the enciphered contents information enciphered with a predetermined contents key and enciphered key information obtained by enciphering the contents key with information about media ID of the first medium as an ID key into a second medium, the method comprising the steps of:

recording temporarily information about media ID of the first medium and the enciphered key information in a predetermined memory other than the first and second media in a condition that the information about the media ID and the enciphered key information correspond to data link ID;

recording the enciphered contents information, the enciphered key information and the data link ID in the second medium and deleting the enciphered key information from the first medium;

obtaining, based on the data link ID read out from the second medium, information about media ID of the first medium recorded temporarily in the memory and the enciphered key information; and comparing the enciphered key information read from the second medium and the enciphered key information read from the memory with each other, and only when the two enciphered key informations coincide, recording independent ID information comprised of information about media ID of the second medium and information about media ID of the first medium read out from the memory in the second medium and deleting, from the memory, information about media ID of the first medium recorded temporarily and the enciphered key information.

4. A contents information recording method according to claim 1, wherein information about media ID of the first media recorded temporarily in the memory is information based on media ID of the first medium read out from the first medium, and information about media ID of the second media is information based on media ID of the second medium read out from the second medium.

5. A contents information recording method according to claim 1, wherein the independent ID information is differential ID information which is a differential value between media ID of the first medium and media ID of the second medium.

6. A contents information recording method according to claim 1, wherein the predetermined contents key is common key or public key, and the ID key is common key using media ID of the first medium or common key using information obtained by converting the media ID of the first medium with a predetermined function.

7. A contents information processing unit comprising:

a memory for temporarily storing information about media ID of a first medium;

an independent ID information forming means for forming independent ID information from information about media ID of a second medium and information about media ID of the first medium recorded temporarily in the memory and recording the independent ID information in the second medium; and a deleting means for, after the independent ID information is formed, deleting, from the memory, information about media ID of the first medium recorded temporarily.

8. A contents information processing unit according to claim 7, wherein information about media ID of the first media recorded temporarily in the memory is information based on media ID of the first medium read out from the first medium, and information about media ID of the second media is information based on media ID of the second medium read out from the second medium.

9. A contents information processing unit according to claim 7, wherein the independent ID information is differential ID information which is a differential value between media ID of the first medium and media ID of the second medium.

10. A contents information processing unit for processing information about ID of each medium upon recording enciphered contents information and enciphered key information from a first medium which recorded therein the enciphered contents information enciphered with a predetermined contents key and enciphered key information obtained by enciphering the contents key with information about media ID of the first medium as an ID key into a second medium, the contents information processing unit comprising:

a memory for temporarily storing information about media ID of the first medium;

an independent ID information forming means for forming independent ID information from information about media ID of the second medium and information about media ID of the first medium recorded temporarily in the memory and after the enciphered contents information and the enciphered key information are recorded in the second medium, recording the independent ID information in the second medium; and a deleting means for, after the independent ID information is formed, deleting, from the memory, information about media ID of the first medium recorded temporarily.

11. A contents information processing unit for processing information about ID of each medium upon recording enciphered contents information and enciphered key information from a first medium which recorded therein the enciphered contents information enciphered with a predetermined contents key and enciphered key information obtained by enciphering the contents key with information about media ID of the first medium as an ID key into a second medium, the contents information processing unit comprising:

a memory for temporarily recording information about media ID of the first medium in a condition that the information about the media ID corresponds to data link ID;

a data link ID writing means for recording the data link ID into the first medium;

an independent ID information forming means for, after the enciphered contents information, the enciphered key information and the data link ID are recorded into the second medium, obtaining information about media ID of the first medium recorded temporarily in the memory based on the data link ID read out from the second medium, forming independent ID information from information about media ID of the first medium and information about media ID of the second medium, and recording the independent ID information in the second medium; and a deleting means for, after the independent ID information is formed, deleting, from the memory, information about media ID of the first medium recorded temporarily.

12. A contents information processing unit for processing information about ID of each medium upon recording enciphered contents information and enciphered key information from a first medium which recorded therein the enciphered contents information enciphered with a predetermined contents key and enciphered key information obtained by enciphering the contents key with information about media ID of the first medium as an ID key into a second medium, the contents information processing unit comprising:

a memory for temporarily recording information about media ID of the first medium and the enciphered key information in a condition that the information about the media ID and the enciphered key information correspond to data link ID;

a data link ID writing means for recording the data link ID into the first medium;

a memory reading means for, after the enciphered contents information, the enciphered key information and the data link ID are recorded in the second medium, reading out, based on the data link ID read out from the second medium, information about media ID of the first medium recorded temporarily and the enciphered key information from the memory;

an enciphered key information comparing means for comparing the enciphered key information read out from the second medium with the enciphered key information read out from the memory by the memory reading means;

an independent ID information forming means for, only when the enciphered key information comparing means determines that the two enciphered key informations coincide, forming independent ID information from information about media ID of the second medium and information about media ID of the first medium, and recording the independent ID information in the second medium; and a deleting means for, after the independent ID information is formed, deleting, from the memory, information about media ID of the first medium recorded temporarily and the enciphered key information.

13. A contents information processing unit according to claim 10, wherein information about media ID of the first media recorded temporarily in the memory is information based on media ID of the first medium read out from the first medium, and information about media ID of the second media is information based on media ID of the second medium read out from the second medium.

14. A contents information processing unit according to claim 10, wherein the independent ID information is differential ID information which is a differential value between media ID of the first medium and media ID of the second medium.

15. A contents information processing unit according to claim 10, wherein the predetermined contents key is common key or public key and the ID key is common key using media ID of the first medium or common key using information obtained by converting the media ID of the first medium with a predetermined function.

16. A contents information recording method for recording enciphered contents information and enciphered key information from a first medium which recorded therein the enciphered contents information enciphered with a predetermined contents key and enciphered key information obtained by enciphering the contents key with information about media ID of the first medium as an ID key into a second medium, the method comprising the steps of:

recording temporarily information about the media ID of the first medium in a predetermined memory other than the first and second media, recording the enciphered contents information and the enciphered key information in backup medium from the first medium, and deleting the enciphered key information from the first medium;

recording the enciphered contents information and the enciphered key information in the second medium from the backup medium; and recording, in the second medium, independent ID information comprised of information about media ID of the second medium and media ID of the first medium recorded temporarily in the memory, and deleting, from the memory, information about media ID of the first media recorded temporarily.

17. A contents information processing unit for processing information about ID of each medium upon recording enciphered contents information and enciphered key information from a first medium which recorded therein the enciphered contents information enciphered with a predetermined contents key and enciphered key information obtained by enciphering the contents key with information about media ID of the first medium as an ID key through a backup medium into a second medium, the contents information processing unit comprising:

a memory for temporarily storing information about media ID of the first medium;

an independent ID information forming means for forming independent ID information from information about media ID of the second medium and information about media ID of the first medium recorded temporarily in the memory, and after the enciphered contents information and the enciphered key information are recorded in the second medium from the backup medium, recording the independent ID information in the second medium; and a deleting means for, after the independent ID information is formed, deleting, from the memory, information about media ID of the first medium recorded temporarily.

18. A contents information deciphering method for obtaining contents information by decryption from a medium in which enciphered contents information enciphered with a predetermined contents key, enciphered key information obtained by enciphering the contents key with information about media ID of other media as ID key, and independent ID information formed from information about media ID of the other media and information about media ID of a proper medium are recorded, the contents information deciphering method comprising:

obtaining information about media ID of the other media from the independent ID information and media ID of the proper media and thereby deciphering the enciphered key information to obtain the contents key; and     deciphering the enciphered contents information using the contents key.

19. A contents information deciphering method according to claim 18, wherein     information about media ID of the other media for forming the independent ID information is information based on media ID of other media read out from the other media, and     information about media ID of the proper media for forming the independent ID information is information based on media ID of the proper media read out from the proper media.

20. A contents information deciphering unit for obtaining contents information by decryption from a medium in which enciphered contents information enciphered with a predetermined contents key, enciphered key information obtained by enciphering the contents key with information about media ID of other media as ID key, and independent ID information formed from information about media ID of the other media and information about media ID of a proper medium are recorded, the contents information deciphering unit comprising:

a contents key deciphering means for obtaining information about media ID of the other media from the independent ID information and media ID of the proper media and thereby deciphering the enciphered key information to obtain the contents key; and     a contents information deciphering means for deciphering the enciphered contents information using the contents key.

21. A contents information deciphering unit according to claim 20, wherein     information about media ID of the other media for forming the independent ID information is information based on media ID of other media read out from the other media, and     information about media ID of the proper media for forming the independent ID information is information based on media ID of the proper media read out from the proper media.

\* \* \* \* \*